Figure 1:
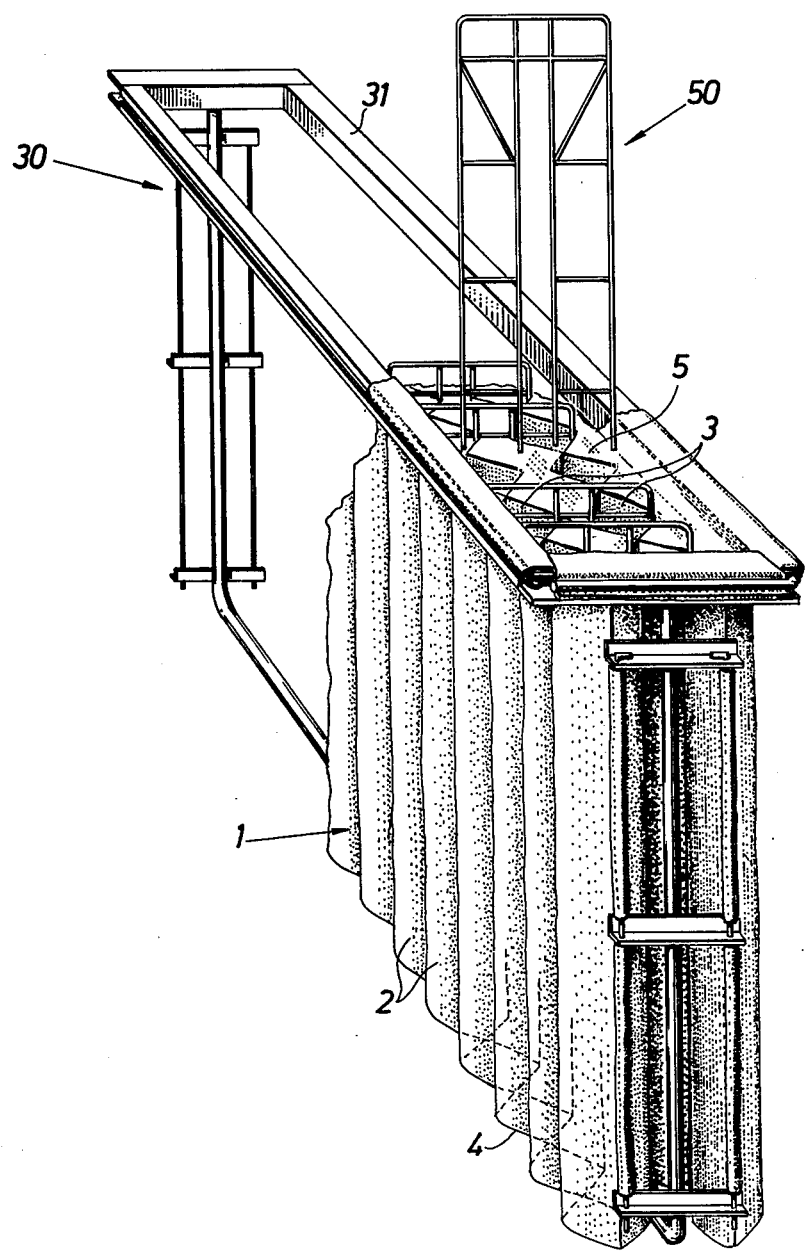

United States Patent [19]

Andersson et al.

[11] 4,129,428
[45] Dec. 12, 1978

[54] COMPACT FILTER MOUNTED IN A CASSETTE FRAME

[75] Inventors: Rune S. Andersson; Svante O. Berglund, both of Växjö, Sweden

[73] Assignee: Aktiebolgatet Svenska Flaktfabriken, Nacka, Sweden

[21] Appl. No.: 828,427

[22] Filed: Aug. 29, 1977

[30] Foreign Application Priority Data

Aug. 31, 1976 [SE] Sweden ............................. 7609624

[51] Int. Cl.$^2$ .............................................. B01D 46/02
[52] U.S. Cl. ............................................ 55/379; 55/381; 55/483; 55/500; 55/509
[58] Field of Search ................. 55/378, 379, 381, 380, 55/483, 484, 500, 502, 501, 507, 509, 511, 521

[56] References Cited

U.S. PATENT DOCUMENTS

| | | | |
|---|---|---|---|
| 3,606,740 | 9/1971 | Ballennie | 55/500 |
| 3,844,749 | 10/1974 | Carter Sr. | 55/378 |
| 3,880,628 | 4/1975 | Gustavsson et al. | 55/500 |

Primary Examiner—Bernard Nozick
Attorney, Agent, or Firm—Dann, Dorfman, Herrell and Skillman

[57] ABSTRACT

A bag-type filter having a removable filter element, said element being mounted in a cassette frame which may be inserted and removed from the filter housing. The filter element has a plurality of tubular sleeves which are open at the top and closed at the bottom to provide elongated gas passsageways surrounded by filter material. The cassette frame includes stiffening members positioned within said sleeves and a rectangular frame surrounding the top of the filter element. The filter element is suspended from said rectangular frame and is releasably clamped to the frame. The cassette frame has a lower structure which may support the cassette outside the housing and provide reinforcement for the cassette. The filter element is clamped to the frame portion of the cassette by collar means extending from the open top of the filter element over the frame portion, and locking rods operable to interlock the collars with the frame portion of the cassette.

6 Claims, 9 Drawing Figures

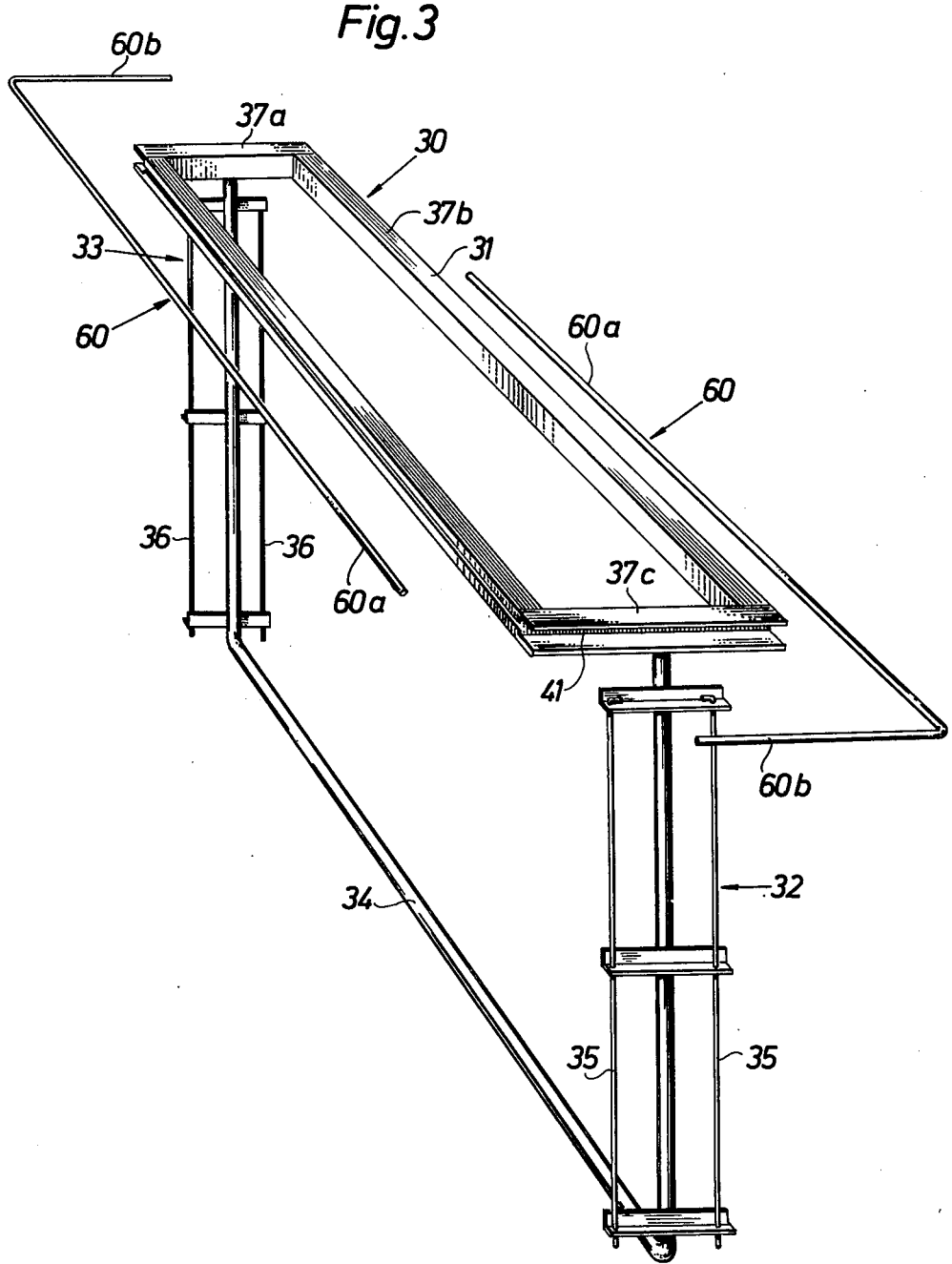

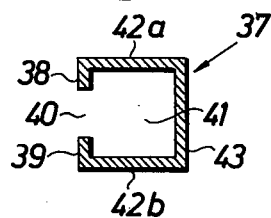
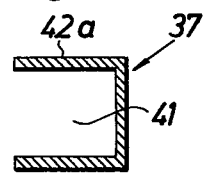
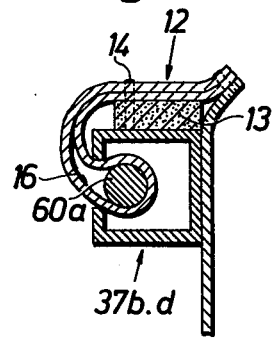
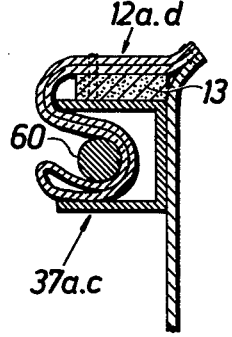
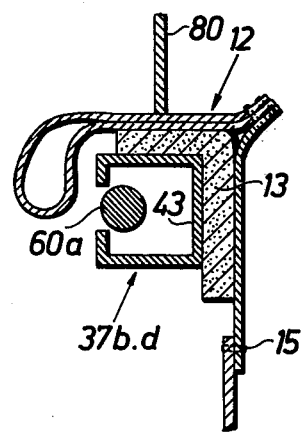

COMPACT FILTER MOUNTED IN A CASSETTE FRAME

This invention relates to a device for mounting a compact filter in a cassette frame. More particularly, the invention provides a cassette having a rectangular frame engaging the upper part of a filter element formed into a plurality of bags having a common gas opening at the top.

Filter means of this kind are used for cleaning gases from dust. The compact filter is clamped in a cassette frame, which is inserted in a filter housing. The dust-loaded gas is introduced into a raw-gas chamber and passes through the filter material whereby the dust is deposited on the surface of said material. The cleaned gas leaves the filter housing via a clean-gas chamber, which can be common to several compact filters. Between the cassette frame and filter housing an efficient sealing must be provided to ensure that all gas on its way from the raw-gas chamber to the clean-gas chamber passes through the filter material. For ensuring efficient operation of the filter, the dust collected on the filter material must be removed regularly.

According to known technique, the dust is removed by subjecting the filter material to vibration movements, which usually are brought about by pressure pulses of a suitable gas, usually air. The filter material in operation is exposed to varying wear in response to gas load, dust concentration, dust type and cleaning process. Satisfactory operation of the filter presupposes regular inspections and, if necessary, exchange of the filter material. It is, therefore, essential that the inspection can be carried out easily and the filter tubes be exchanged simply and rapidly, so that the filter section concerned must not be taken out of operation for a long period. Conventional filters do not meet these requirements. In such known installations, the exchange of filters is a tedious and heavy work, which often requires several persons, and the manufacturing, transportation and storage costs for the filters and their spare parts are high in view of their complicated, bulky and heavy structural design. Owing to these factors, the filter process on the whole often requires large resources or does not operate satisfactorily.

The present invention has the object to eliminate the aforesaid disadvantages and produce a filter means of the above kind, which is of simple and lightweight design, the parts of which are nonexpensive to manufacture, transport and store, and the filter bags of which, if necessary, can be exchanged rapidly and easily by one man. This object is achieved by a device of the present invention, including the several embodiments thereof. The design of the cassette frame, compact filter element and locking rod ensures a very efficient and well-defined attachment of the compact filter element to the cassette frame. The mounting can easily be carried out by one man, because one side at a time is fastened. During filter exchange, the locking rods can be released and, thus, the filter element can be removed from the cassette frame, in a very simple way. When mounting, the filter collar is folded over the upper side of the frame and serves both as a fastening means and simultaneously as a sealing means between the cassette frame and the filter housing when the frame, rigid by design, is pressed upward against the connecting frame of the filter housing. Said sealing is very efficient, and due to the absence of loose packings a safe sealing effect always is ensured during filter exchange, because the filter collar portion serving as packing for a new filter element automatically is intact. The absence of loose packings apparently provides advantages also from a handling and storing aspect.

Figure 2A:
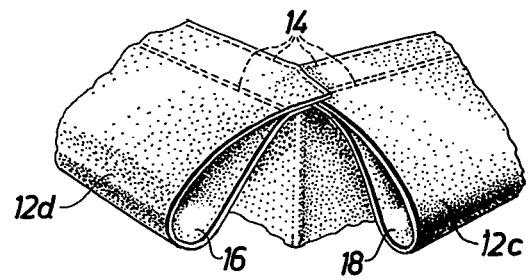
Figure 2:
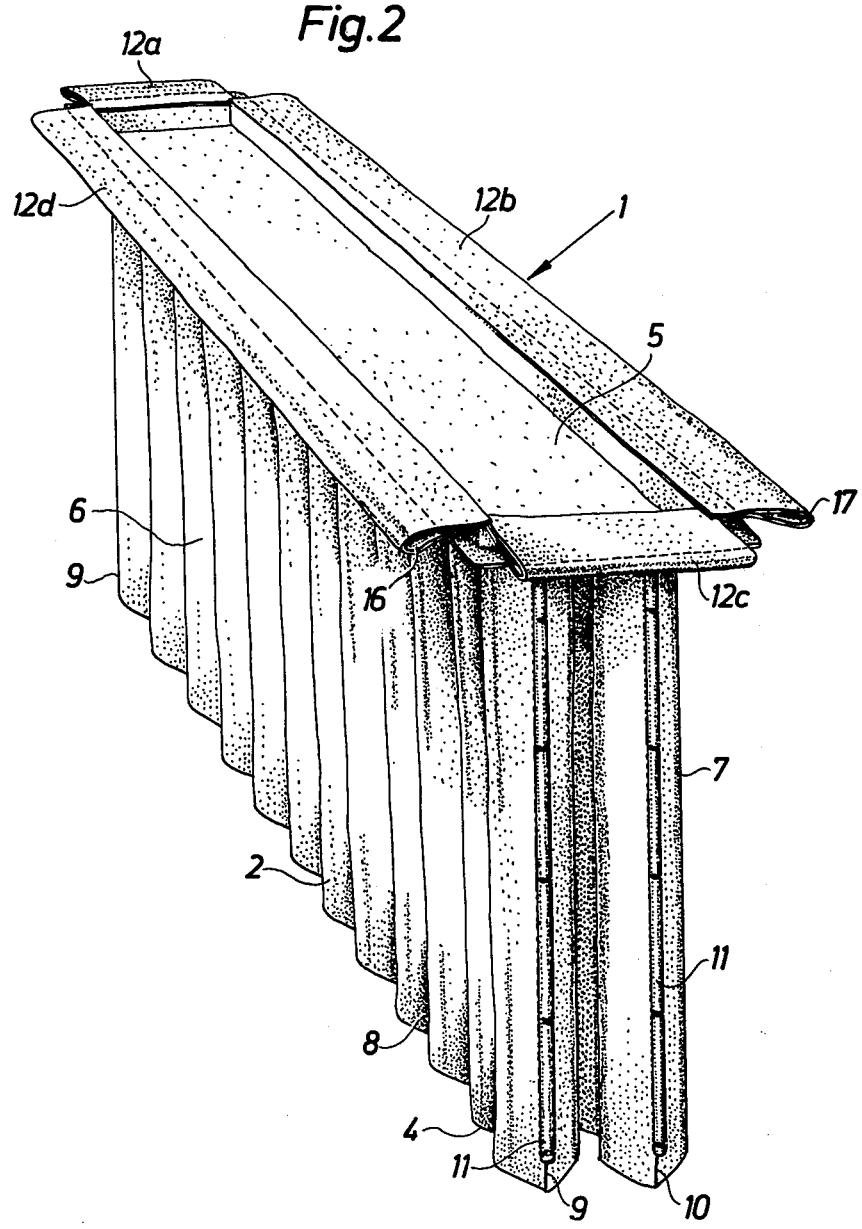

The invention is described in greater detail in the following, with reference to the accompanying drawings, in which FIG. 1 is a view of a compact filter element without illustrating the passaways therein clamped in a cassette frame, FIG. 2 is a view of the compact filter element, FIG. 2a shows a detail of the compact filter, FIG. 3 is a view of the cassette frame with mounting means, FIGS. 4a-b are sectional views of a detail of the cassette frame, FIGS. 5a-c are sectional views of a detail of the cassette frame element, FIG. 5c showing an alternate form of filter collar with a detail of the compact filter.

In FIG. 1, the numeral 1 designates a compact filter element comprising a plurality of filter bags 2, which constitute clean-gas passageways 3 for the cleaned gas. The passageways are closed at the lower portion 4 of the filter bags and at the upper portion of the filter element form a common clean-gas opening 5. The compact filter element is mounted in a cassette frame 30 (FIG. 3) consisting of a rectangular frame 31, which comprises means for mounting the compact filter element in the cassette frame. The configuration of cassette frame and compact filter element is adapted to suitably be inserted in a filter housing (not shown) where the common clean-gas opening of the filter element sealingly is connected to the clean-gas passageways of the filter housing. It is apparent that one or more cassette frames with associated filters can be connected to the same filter housing. The numeral 50 (FIG. 1) designates means for stiffening the filter bags.

In FIG. 2 a view of the compact filter element separated from the cassette frame is shown. The filter element shown consists of filter material formed with two deep folds. From said folds two rows 6 and 7 of filter bags 2 have been formed by sewing together the folds with seams 8 in parallel with each other. At the end surfaces 9 and 10 of each row members 11 are provided to clamp the filter element in the cassette frame. Said members preferably have the form of longitudinal sleeves. The compact filter element at its upper portion has a clean-gas opening 5 common to all filter bags and interconnecting the clean-gas passageways formed by the respective filter bags. The filter bags are closed at their lower portion 4 by an end portion. At the upper portion of the compact filter element, i.e. surrounding the common clean-gas opening 5, collars 12a-d are provided which on at least two sides are formed with sleeves 16 and 17. The compact filter element can also be formed with one row or with more than two rows of filter bags.

In FIG. 2a the design of two adjacent collars 12c and 12d of the compact filter is shown in detail. The collars are sewn together at a right angle relative to each other and formed as sleeves 16 and 18 being open at their short sides. The dashed lines 14 indicate seams, by which the collars are connected to the remaining parts of the compact filter element and by which the sleeves are formed.

In FIG. 3 a view of the cassette frame 30 is shown. The upper portion of the frame is a rectangular frame 31, at the opposite ends of which end wall pieces 32 and 33 are provided. Said end wall pieces include clamping means 35 and 36 to detachably clamp each row of filter bags at the opposed end surfaces. The clamping means 35 and 36 preferably are bars adapted to be inserted through the longitudinal sleeves at the ends of the filter bag rows. The two opposed end wall pieces 32 and 33 are rigidly interconnected at their lower end by a bottom beam 34, which may be formed as shown in the Figure, i.e. the beam, or preferably the tubular section, is attached to the ends of the frame 31 and constitutes an integrated part of the end wall pieces 32 and 33, froming a bow at the lower portion of the cassette frame. This bow serves as a support element for the cassette frame before its positioning in the filter housing and also renders it possible to apply a relatively great clamping pressure to the clamping of the filter bag rows, i.e. without thereby bending the end wall pieces toward each other. Surrounding the upper end of the filter element, the rectangular frame 31 consists of four channel elements 37a through d of U-shaped cross-section which form an outwardly open U-shaped groove 41 extending about the frame. In the Figure also two L-shaped locking rods 60 are shown which are used for fixing the filter elements in the cassette frame.

In FIGS. 4a and 4b the design of the U-shaped channel elements 37 constituting the rectangular frame 31 is shown in detail. Two sides thereof, preferably the opposed long sides (37b and d in FIG. 3) are formed by elements with a cross-section as shown in FIG. 4a. The U-section, thus, faces with its groove 41 open faces to the side, while the two flanges 42a and 42b of the section are horizontal. The web 43 of the section is vertical. The outer ends of the flanges are provided with lips 38 and 39 directed toward each other and forming an open gap 40 therebetween. The remaining two elements of the frame (37a and c in FIG. 3) also are formed with horizontal flanges 42a, and b and upstanding webs 43, but these elements have no lips.

The cassette frame is inserted in the filter housing and locked thereto in a way not described here in detail. As can be seen in FIGS. 5a, b, and c a packing 13 is attached to the filter collar 12 and provides a more efficient sealing between the filter housing and cassette frame. The packing preferably is attached to the collar by seams 14. The packing 13 according to FIGS. 5a and 5b extends along the upper flange 42a of the element 37, while the packing 13 according to FIG. 5c also extends along the web 43 of the element 37. The packing also serves as a reinforcement of the collar at the portion where it is folded over the frame element and where substantial wear can be expected. It is also apparent from said lastmentioned Figure, how the collar 12 is connected to the remaining compact filter by a seam 15.

In FIGS. 5a–c is shown in detail how the attachment of the compact filter to the elements 37 of the frame is effected. The collar 12 of the compact filter which is formed with a sleeve 16 is inserted in the groove in the elements 37b and 37d provided with lips. From the lateral edge of the elements thereafter one leg 60a of the locking rod 60 is introduced through the sleeve 16 located in the groove. The total thickness of the locking rod and sleeve exceeds the size of the gap 40, so that an efficient locking of the flange 12 to the element 37b and d is obtained. This is apparent from FIG. 5a. The adjacent collars 12a and 12c are placed about the other leg 60b of the locking rod before this is pressed into the open groove of the adjacent element 37a, c. This is shown in FIG. 5b. The total thickness of the locking rod 60 and collar 12a and 12c respectively, preferably is adjusted so that also said leg 60b remains in the groove of the element. The thickness of the legs 60a and 60b is less than the width of the groove 41. When both locking rods 60 have been introduced in the manner intended, an efficient releasable retention of the compact filter in the cassette frame has been obtained. When the collar of the filter is folded over the upper flange 42a of the elements 37, the filter material serves as a sealing means between the cassette frame and the connecting frame 80 of the filter housing (see FIG. 5c).

The filter device according to the invention operates as follows. For mounting the compact filter element in the filter cassette, the cassette is placed with the bottom beam 34 on the floor or on a floor plane provided at the filter housing. The compact filter element, which can be delivered in folded-together state, is then positioned in the cassette frame, but with its collars folded over the upper flange of the U-section. The filter collars are fastened in the frame by inserting the locking rods 60 in the sleeves of the collars when the sleeves are in the opening of the U-beam. When the two longsides have been fixed, the other leg of the respective locking rod is pressed into the adjacent U-beam opening, and due to the location of the filter collar wrapped partially around the leg, the filter element is efficiently locked to the cassette frame. As one side is fastened at a time, also this moment apparently can be carried out easily by one person. The filter material is clamped in the end walls of the cassette by threading the bars 32 and 33 through holes in the end wall pieces and the sleeves 11. During this moment, the filter material is in slack state, which renders said clamping easy. The stiffening elements 50 are thereafter introduced into the respective filter bags, which thereby assumes a rhombic or square configuration, seen by way of horizontal section, which is highly advantageous, because the planes of the lateral surfaces of adjacent filter bags form a substantially right angle to each other. The filter surfaces hereby do not cover each other, and there is no risk of dust migration from one surface to an adjacent one in connection with the cleaning operations. When all stiffening elements have been mounted, the entire compact filter element is very stably fastened in the cassette frame, i.e. the filter material can withstand variations in the raw-gas flow and it can be subjected to cleaning operations without jeopardizing its attachment to the cassette frame. Thereafter the cassette frame with the filter element is inserted in the filter housing and connected to the clean-gas passageway of the filter housing by pressing the frame of the cassette with intermediate collars, which serve as packing, against the connecting frame of the filter housing and then locking it by a suitable means. The filter can be dismounted by carrying out the above operations reversed and in inverse order. It is apparent, that the invention also renders possible simple and rapid dismounting of the filter element.

The invention, of course, can be applied to filters of different dimensions. The filter cassettes, however, must not be so large and heavy that they are difficult to handle, nor must they be so small as to have low capacity, because then a great number of cassettes are required for a definite capacity demand. According to an embodiment, the cassette frame has a length of 0.95 m, a width of 0.25 m and a height of 1.55 m. The filter surface amounts to 7.5 m$^2$. The weight of the cassette frame is 15 kg, and the total weight of a compact filter element mounted in the cassette frame is 20 kg. Filters having said weight and designed according to the invention, as may be pointed out again, can easily be handled by one man. Four to eighteen cassette frames with filter elements are positioned in a common filter housing.

We claim:

1. For use in a filter housing, at least one filter cassette, a bag-type filter element supported in said cassette, said filter element comprising a plurality of filter bags forming gas passageways which, at their lower ends are closed, and at their upper ends form a common gas opening, said element having collar means extending outwardly therefrom around said upper end to comprise means for fastening the filter element in the cassette, said cassette having a rectangular frame surrounding said upper end and underlying said collar means, said frame adapted to connect said opening with the filter housing and comprising four channel elements of U-shaped cross-section facing with the groove opening outwardly, two of said channel elements at the outer edges having lips directed toward each other and forming a gap therebetween of a width smaller than the width of the groove, said collar means extending about the periphery of the opening being folded over the upper sides of the channel elements and into the grooves thereof, and the collar means of the filter element being formed with sleeves for the sides associated with the said two channel elements provided with lips, two L-shaped locking rods having two legs of a thickness less than the width of the groove, each inserted with one leg in one of said sleeves to lockingly retain said sleeve in the respective channel element provided with lips, the other locking rod leg, with the collar wrapped partially around it, being lockingly pressed into the groove of the adjacent channel element in such a manner than an efficient detachable locking of the filter element to the cassette frame is obtained, said collar means forming a seal between the upper surface of the channel element and the filter housing.

2. A device according to claim 1, wherein the opposed channel elements of the rectangular frame are of the same kind.

3. A device according to claim 1, wherein the collar means of the filter element is provided with a packing attached thereto, which upon the locking of the cassette frame to the filter housing serves to seal between the cassette frame, said compact filter element and filter housing.

4. A device according to claim 3, wherein the packing is a strip which extends along at least the upper side of the respective channel element.

5. A device according to claim 4 wherein the packing is attached to the collar means by at least two seams.

6. A device according to claim 5 wherein the collar comprises a separate ring connected to the filter element by seams.

* * * * *

UNITED STATES PATENT OFFICE
CERTIFICATE OF CORRECTION

Patent No. 4,129,428     Dated December 12, 1978

Inventor(s) Rune S. Andersson; Svante O. Berglund

It is certified that error appears in the above-identified patent and that said Letters Patent are hereby corrected as shown below:

Col. 2, lines 9-20 should read as follows:

--Fig. 1 is a view of a compact filter element clamped in a cassette frame,

Fig. 2 is a view of the compact filter element without illustrating the passageways therein, Fig. 2a shows a detail of the compact filter element, Fig. 3 is a view of the cassette frame with mounting means, Figs. 4a-b are sectional views of a detail of the cassette frame, Figs. 5a-c are sectional views of a detail of the cassette frame with a detail of the compact filter element, Fig. 5c showing an alternate form of filter collar.--

Signed and Sealed this

*Twenty-second* Day of *May 1979*

[SEAL]

*Attest:*

RUTH C. MASON
*Attesting Officer*

DONALD W. BANNER
*Commissioner of Patents and Trademarks*